US012658501B2

(12) United States Patent
Lee et al.

(10) Patent No.: US 12,658,501 B2
(45) Date of Patent: Jun. 16, 2026

(54) BATTERY MODULE AND MANUFACTURING METHOD THEREOF

(71) Applicant: LG ENERGY SOLUTION, LTD., Seoul (KR)

(72) Inventors: Changhun Lee, Daejeon (KR); Junyeob Seong, Daejeon (KR); Myungki Park, Daejeon (KR); Jonghwa Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 922 days.

(21) Appl. No.: 17/623,721

(22) PCT Filed: Apr. 1, 2021

(86) PCT No.: PCT/KR2021/004058
§ 371 (c)(1),
(2) Date: Dec. 29, 2021

(87) PCT Pub. No.: WO2021/215691
PCT Pub. Date: Oct. 28, 2021

(65) Prior Publication Data
US 2022/0247011 A1 Aug. 4, 2022

(30) Foreign Application Priority Data

Apr. 22, 2020 (KR) ........................ 10-2020-0048917

(51) Int. Cl.
*H01M 10/6556* (2014.01)
*H01M 10/613* (2014.01)
*H01M 10/653* (2014.01)
(52) U.S. Cl.
CPC ..... *H01M 10/6556* (2015.04); *H01M 10/613* (2015.04); *H01M 10/653* (2015.04); *H01M 2220/20* (2013.01)

(58) Field of Classification Search
CPC ........... H01M 10/653; H01M 10/6556; H01M 10/613; H01M 2220/20
See application file for complete search history.

(56) References Cited

U.S. PATENT DOCUMENTS

2005/0064266 A1    3/2005   Abdou et al.
2009/0142628 A1    6/2009   Okada et al.
(Continued)

FOREIGN PATENT DOCUMENTS

CN        102578918 A        7/2012
CN        104025370 A        9/2014
(Continued)

OTHER PUBLICATIONS

Extended European Search Report dated Aug. 19, 2022 for Application No. 21792184.0.
(Continued)

*Primary Examiner* — Holly Rickman
(74) *Attorney, Agent, or Firm* — Birch, Stewart, Kolasch & Birch, LLP

(57) ABSTRACT

Discussed is a battery module including a battery cell stack in which a plurality of battery cells are stacked; a module frame for accommodating the battery cell stack; and a cooling plate located below the module frame, wherein a bottom part of the module frame and the cooling plate form a heat sink, and wherein a guide part is formed on the bottom part of the module frame, and the cooling plate is coupled to the bottom part of the module frame to correspond to the guide part.

7 Claims, 8 Drawing Sheets

(56)     References Cited

U.S. PATENT DOCUMENTS

| | | |
|---|---|---|
| 2012/0227931 A1 | 9/2012 | Heckenberger et al. |
| 2012/0312614 A1 | 12/2012 | Fujiwara et al. |
| 2013/0052496 A1 | 2/2013 | Han |
| 2013/0149582 A1 | 6/2013 | Kimura et al. |
| 2014/0234691 A1 | 8/2014 | Lee et al. |
| 2015/0140366 A1 | 5/2015 | Nicholls |
| 2015/0236314 A1 | 8/2015 | Lee et al. |
| 2017/0176108 A1 | 6/2017 | Palanchon et al. |
| 2018/0019508 A1 | 1/2018 | Lee et al. |
| 2018/0047954 A1 | 2/2018 | Yoo et al. |
| 2018/0053920 A1* | 2/2018 | Seo ..................... H01M 10/486 |
| 2018/0358646 A1 | 12/2018 | Yu et al. |
| 2019/0074562 A1 | 3/2019 | Kim et al. |
| 2019/0148799 A1 | 5/2019 | Lim et al. |
| 2019/0280258 A1 | 9/2019 | Kim et al. |
| 2020/0006825 A1 | 1/2020 | Lee et al. |
| 2020/0067155 A1 | 2/2020 | Hwang et al. |

FOREIGN PATENT DOCUMENTS

| | | |
|---|---|---|
| CN | 104471783 A | 3/2015 |
| CN | 104851998 A | 8/2015 |
| CN | 100025423 A | 10/2016 |
| CN | 106575804 A | 4/2017 |
| CN | 107431161 A | 12/2017 |
| CN | 208071410 U | 7/2019 |
| CN | 208217042 U | 8/2019 |
| CN | 110854320 A | 2/2020 |
| DE | 102008059961 A1 | 6/2010 |
| DE | 102011080813 A1 | 2/2013 |
| DE | 102012221503 A1 | 3/2014 |
| DE | 102017220862 A1 | 5/2019 |
| JP | 2005-602896 A | 1/2005 |
| JP | 2009-134938 A | 6/2009 |
| JP | 2013-504844 A | 2/2013 |
| JP | 2013-122818 A | 6/2013 |
| JP | 2015-138589 A | 7/2015 |
| JP | 2015-527688 A | 9/2015 |
| JP | 2018-181749 A | 11/2018 |
| JP | 2012-256468 A | 4/2026 |
| KR | 10-2013-0022504 A | 3/2013 |
| KR | 10-2015-0137841 A | 12/2015 |
| KR | 10-2016-0023379 A | 3/2016 |
| KR | 10-2016-0142663 A | 12/2016 |
| KR | 10-2017-0027848 A | 3/2017 |
| KR | 10-2017-0085144 A | 8/2017 |
| KR | 10-2016-0087262 A | 7/2018 |
| KR | 10-2018-0081996 A | 7/2018 |
| KR | 10-2019-0026237 A | 3/2019 |
| KR | 10-2019-0053574 A | 5/2019 |
| KR | 10-2020-0001692 A | 1/2020 |
| WO | WO 2015/196301 A1 | 12/2015 |

OTHER PUBLICATIONS

International Search Report (PCT/ISA/210) issued in PCT/KR2021/004053. dated Jul. 8, 2021.

* cited by examiner

(Conventional Art)

【FIG. 1】

【FIG. 3】
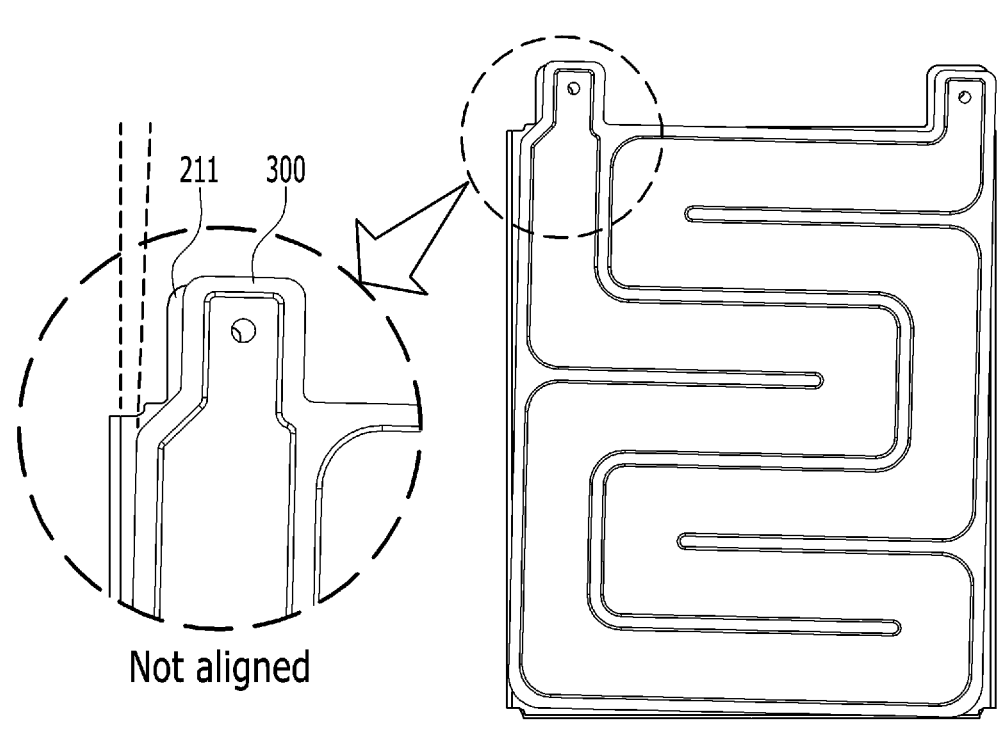
Not aligned

【FIG. 4】
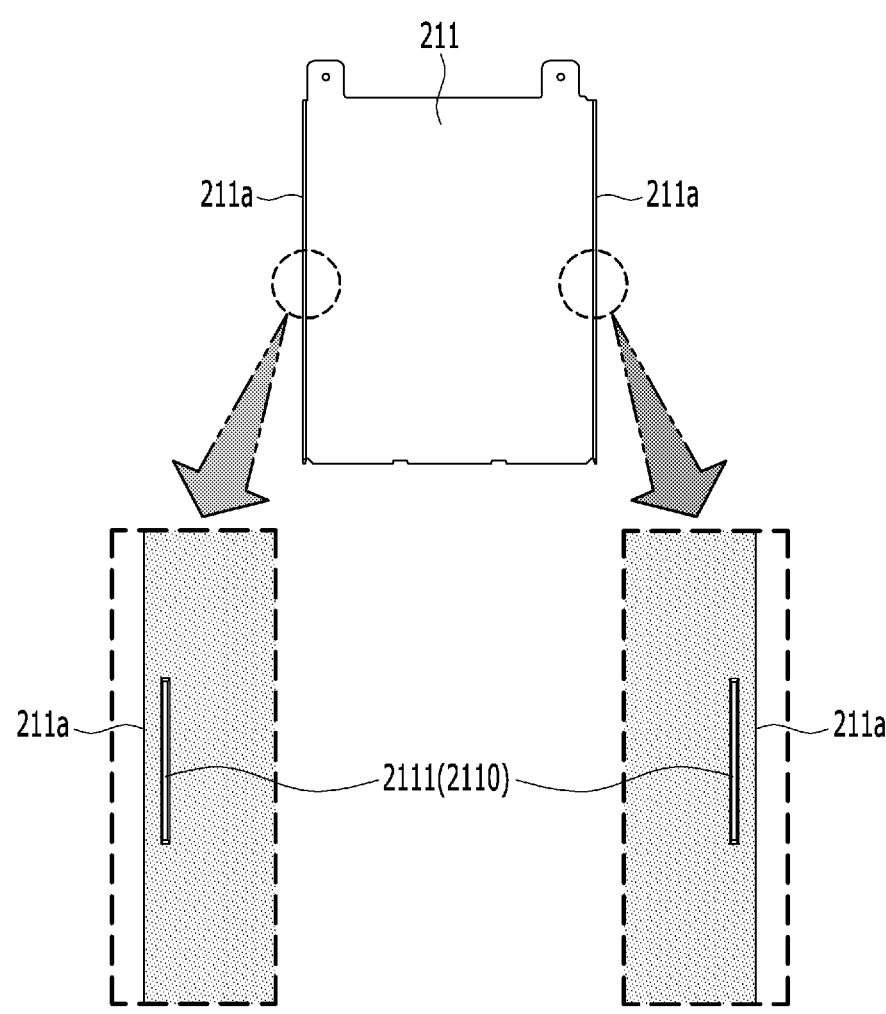

【FIG. 5】
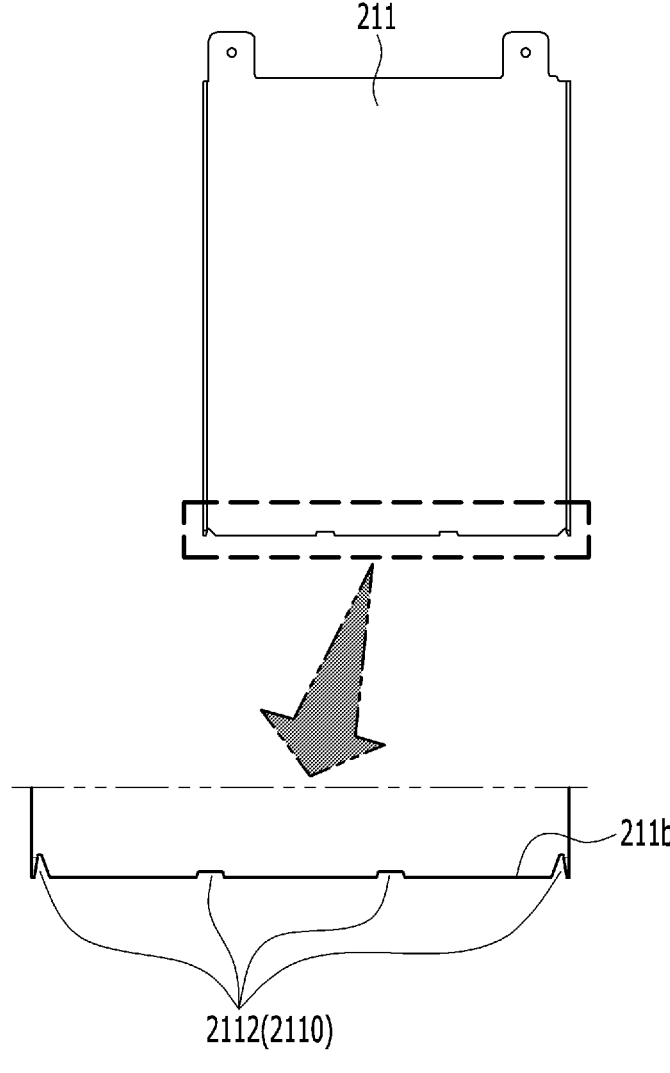

【FIG. 6】
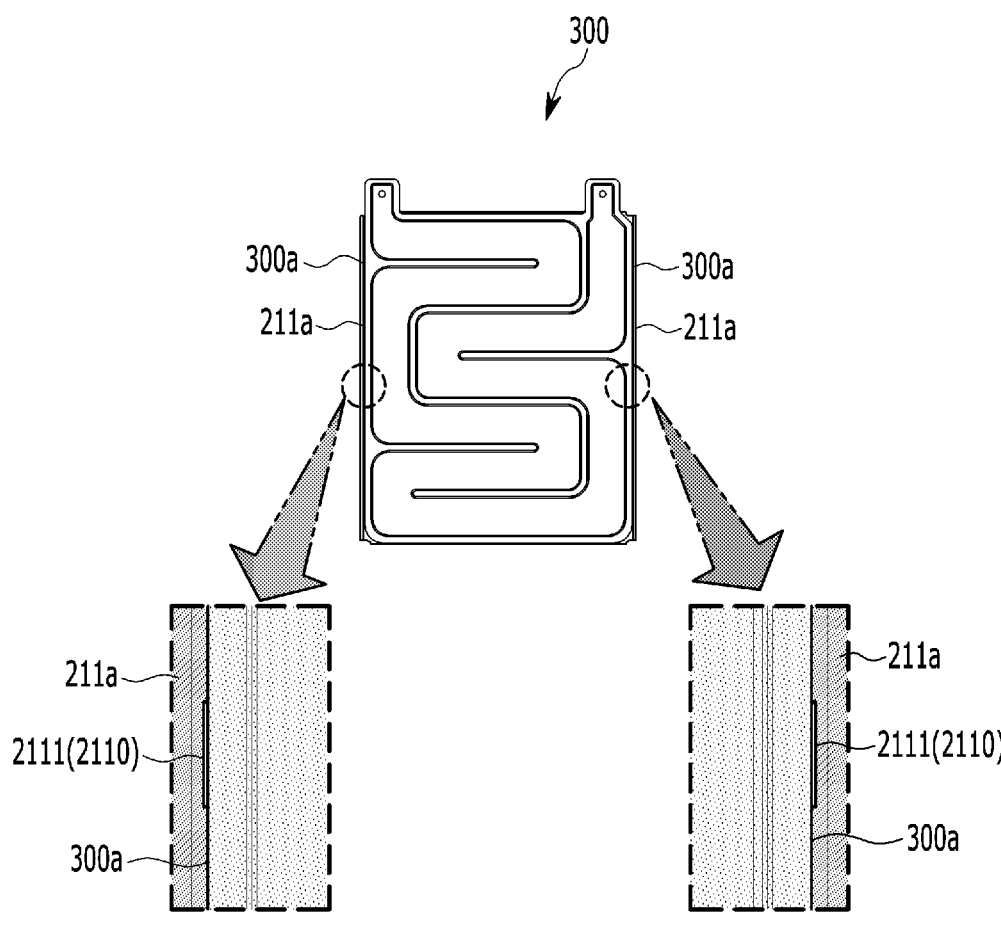

【FIG. 7】
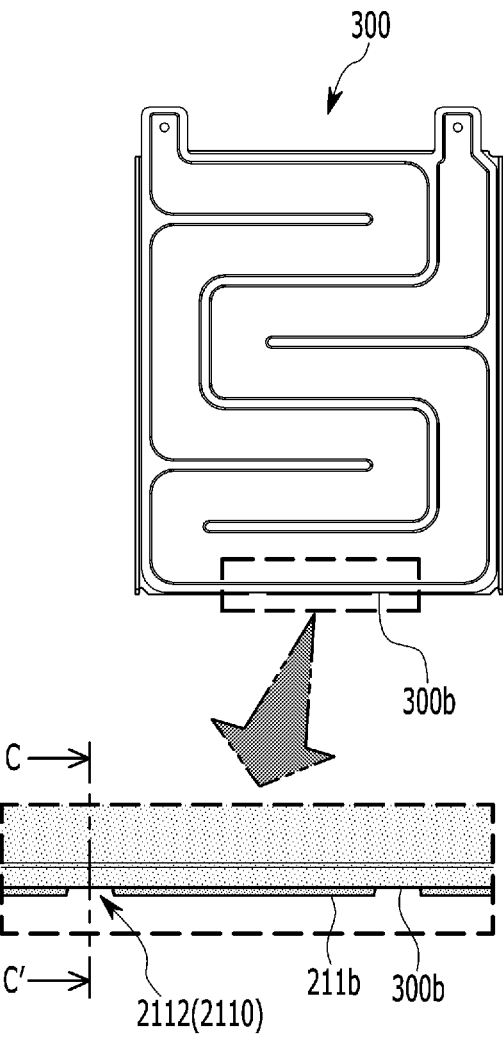

【FIG. 8】
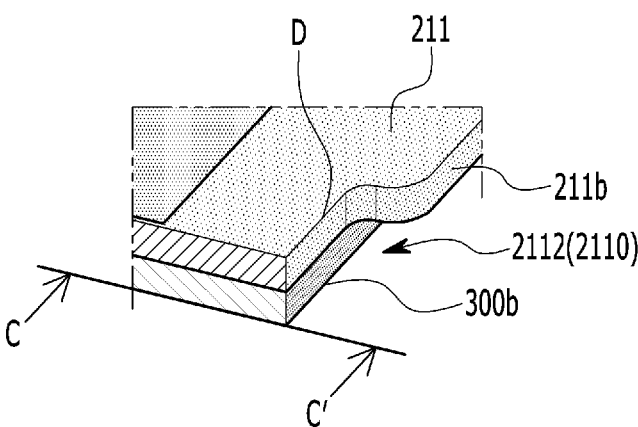

BATTERY MODULE AND MANUFACTURING METHOD THEREOF

CROSS CITATION WITH RELATED APPLICATION

This application claims the benefit of Korean Patent Application No. 10-2020-0048917 filed on Apr. 22, 2020 with the Korean Intellectual Property Office, the disclosure of which is incorporated herein by reference in its entirety.

TECHNICAL FIELD

The present disclosure relates to a battery module and a method for manufacturing the same, and more particularly, to a battery module having improved assembling property, and a method for manufacturing the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series or in parallel.

Meanwhile, when a plurality of battery cells are connected in series/parallel to configure a battery pack, a method of configuring a battery module composed of at least one battery cell and then adding other components to at least one battery module to configure a battery pack is common.

Such a battery module may include a battery cell stack in which a plurality of battery cells are stacked, a module frame for accommodating the battery cell stack, and a heat sink for cooling the plurality of battery cells.

FIG. 1 is a diagram showing a battery module coupled to a heat sink according to a conventional art.

Referring to FIG. 1, a conventional battery module includes a battery cell stack in which a plurality of battery cells 10 are stacked, a module frame for accommodating the battery cell stack, and a thermal conductive resin layer 15 located between a bottom part 20 of the module frame and the battery cell stack. Such a battery module can be formed under the bottom part 20 of the module frame bottom and coupled with a heat sink 30 that provides a cooling function to the plurality of battery cells 10, thereby forming a battery pack. Here, a thermal conductive layer 18 may be further formed between the bottom part 20 of the battery module and the heat sink 30. At this time, the heat sink includes a lower plate 31 and an upper plate 29, and a refrigerant may flow between the lower plate 31 and the upper plate 29.

Conventionally, in order to improve the cooling performance of the battery module and/or the battery pack, a separate cooling structure, for example, a heat sink, is required for each battery pack unit. Therefore, the cooling structure tended to be complicated, and the space between the refrigerant and the battery cell stack 10 is formed by a multi-layer structure consisting of an upper plate 29 and a module frame bottom part 20, whereby there was a limit that it has no choice but to cool the battery cells indirectly.

DETAILED DESCRIPTION OF THE INVENTION

Technical Problem

It is an object of the present disclosure to provide a battery module having improved assembling property, and a method for manufacturing the same.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery module comprising: a battery cell stack in which a plurality of battery cells are stacked; a module frame for accommodating the battery cell stack; and a cooling plate located below the module frame, wherein a bottom part of the module frame and the cooling plate form a heat sink, and wherein a guide part is formed on the bottom part of the module frame, and the cooling plate is coupled to the bottom part of the module frame so as to correspond to the guide part.

The guide part may include a first guide part formed at both side ends of the bottom part of the module frame and engraved in parallel with the edge side of the both side ends.

The first guide part may be arranged so as to align with both sides of the cooling plate.

The guide part may include a second guide part having a groove shape at the rear end edge side of the bottom part of the module frame, and a depression line formed by the groove shape may be arranged so as to correspond to a rear side of the cooling plate.

The groove shape may be formed by a plurality of grooves, and the depression lines of the plurality of grooves may be located on the same line.

In order to achieve the above object, according to another embodiment of the present disclosure, there is provided a method of manufacturing a battery module, the method comprising the steps of: making both sides of the cooling plate correspond to first guide parts formed at both side ends of the bottom part of the module frame; making a rear side of the cooling plate correspond to a second guide part formed to be depressed at a rear end of the bottom part of the module frame; and coupling the cooling plate to the bottom part of the module frame.

In the step of making both sides of the cooling plate correspond to first guide parts, both sides of the cooling plate may be aligned with the guide part lines formed by the first guide parts.

In the step of making a rear side of the cooling plate correspond to the second guide part, the rear edge of the cooling plate may be aligned with the depression line of the second guide part.

In the step of coupling the cooling plate to the bottom part of the module frame, the frame part of the cooling plate may be weld-coupled to the bottom part of the module frame.

According to yet another embodiment of the present disclosure, there is provided a battery pack comprising the above-mentioned battery module.

Advantageous Effects

According to embodiments of the present disclosure, the cooling plate can be assembled to the bottom part of the module frame in accordance with the guide part, thereby preventing assembly defects and leakage caused thereby and improving the quality of the battery module.

In addition, the cooling structure can be simplified through the cooling structure in which the module frame and the heat sink are integrated.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 3 is a diagram showing a case in which an assembly line of a heat sink does not align as a comparative example;

FIG. 4 is a section A in FIG. 2, which is a diagram showing a first guide part according to an embodiment of the present disclosure;

FIG. 5 is a section A in FIG. 2, which is a diagram showing a second guide part according to an embodiment of the present disclosure;

FIG. 6 is a section A in FIG. 2, which is a diagram showing the first guide part when the cooling plate is coupled to the bottom part of the module frame;

FIG. 7 is a section B in FIG. 2, which is a diagram showing the second guide part when the cooling plate is coupled to the bottom part of the module frame; and FIG. 8 is a diagram showing a section taken line C-C' in FIG. 7.

DETAILED DESCRIPTION OF THE EMBODIMENTS

It should be appreciated that the example embodiments, which will be described below, are illustratively described to assist in the understand the present disclosure, and the present disclosure can be variously modified to be carried out differently from the example embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific example embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, the structure of a battery module according to an embodiment of the present disclosure will be described with reference to FIG. 2.

Figure 1:
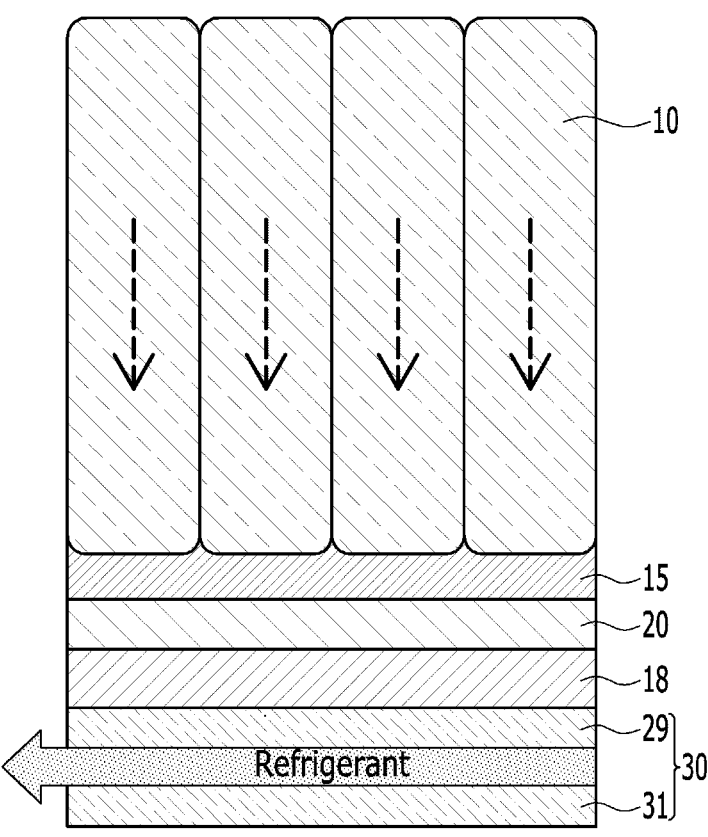
FIG. 1 is a diagram showing a battery module coupled to a heat sink according to a conventional art.
Figure 2:
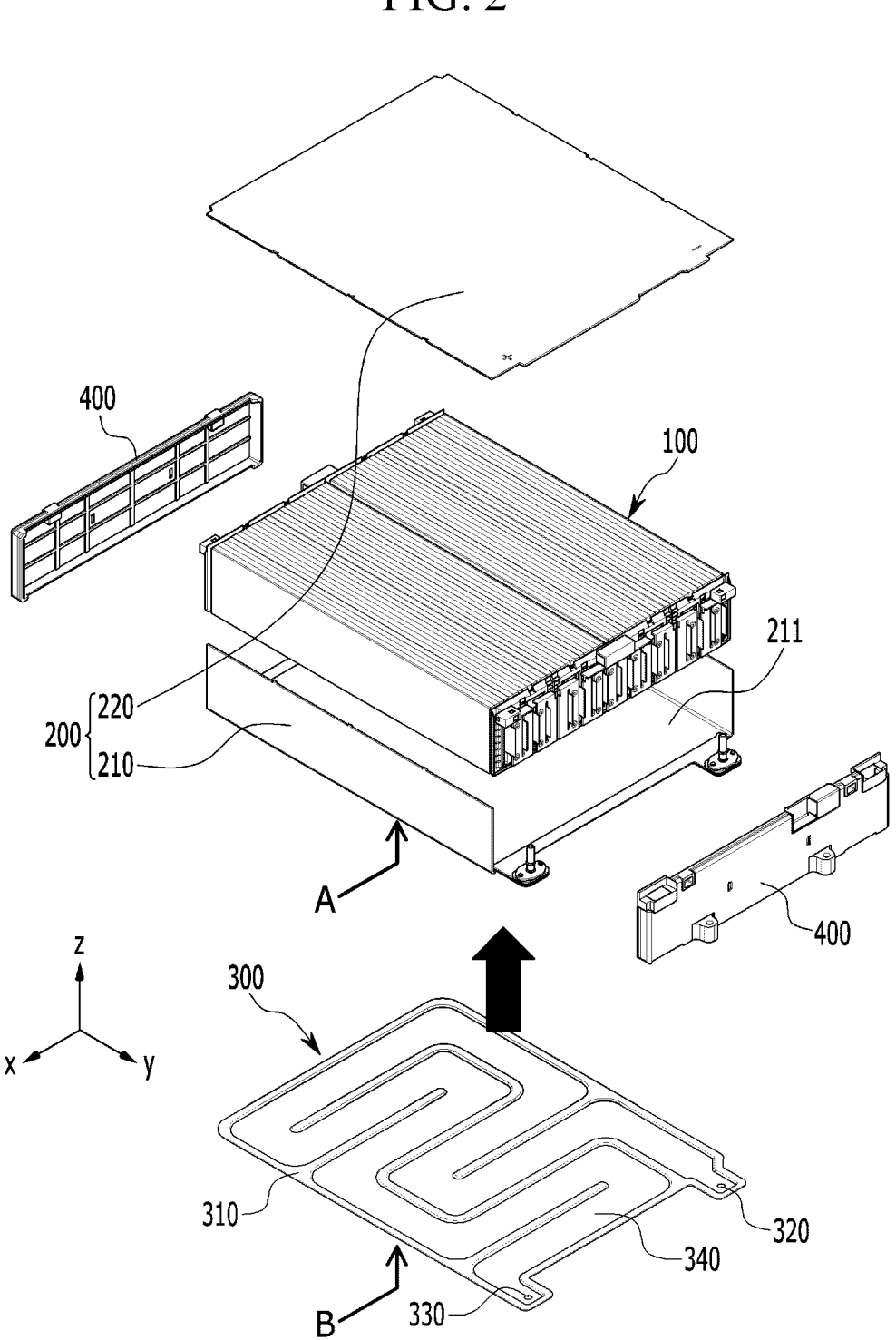
FIG. 2 is an exploded perspective view of the battery module according to an embodiment of the present disclosure.

FIG. 2 is an exploded perspective view of the battery module according to an embodiment of the present disclosure.

Referring to FIG. 2, the battery module according to an embodiment of the present disclosure includes a battery cell stack 100 in which a plurality of battery cells are stacked, a module frame 200 for accommodating the battery cell stack 100; and a cooling plate 300 located on a lower side of the module frame to cool the plurality of battery cells.

The battery cell according to the embodiment of the present disclosure is a secondary battery and may be configured into a pouch-type secondary battery. Such a battery cell may be composed of a plurality of cells, and the plurality of battery cells may be mutually stacked so as to be electrically connected to each other, thereby forming the battery cell stack 100. Each of the plurality of battery cells may include an electrode assembly, a cell case, and an electrode lead protruding from the electrode assembly.

The module frame 200 accommodates the battery cell stack 100. According to an embodiment of the present disclosure, the module frame 200 may include a lower frame 210 for covering the lower surface and both side surfaces of the battery cell stack 100, and an upper plate 220 for covering the upper surface of the battery cell stack 100. However, the structure of the module frame 200 is not limited thereto, and may be a mono frame shape surrounded by four surfaces except the front and rear surfaces of the battery cell stack 100.

The battery module according to the embodiment of the present disclosure may further include end plates 400 for covering the front and rear surfaces of the battery cell stack 100. The battery cell stack 100 accommodated therein can be physically protected through the module frame 200 described above.

The cooling plate 300 may be formed at the lower part of the module frame 200. The cooling plate 300 may include a frame part 310 forming a skeleton of the cooling plate 300 and contacting with the bottom part 211 of the module frame 200, an inlet part 320 formed on one side of the cooling plate 300 to supply a refrigerant from the outside to the inside, an outlet part 330 formed on one side of the heat sink so that the refrigerant flowing inside the heat sink flows to the outside of the heat sink, and a flow passage part 340 that connects the inlet part 320 and the outlet part 330 and allows the refrigerant to flow. A cooling integrated heat sink structure may be formed in which the cooling plate 300 on the lower side and the bottom part 211 of the module frame on the upper side are arranged up and down, and the refrigerant flows through the flow passage part 340 formed therebetween.

Specifically, the flow passage part 340 may refer to a structure in which a frame part 310 in contact with the lower surface of the lower frame 210 corresponding to the bottom part of the module frame 200 is formed to be depressed downward. The upper side of the flow passage part 340 is opened, so that a flow passage is formed between the flow passage part 340 and the bottom part 211 of the module frame 200, and a refrigerant can flow through the flow passage. In other words, the battery module according to the embodiment of the present disclosure can have a cooling integrated structure in which the bottom part 211 of the module frame 200 serves to correspond to the upper plate of the cooling plate 300.

Conventionally, since a structure in which the refrigerant flows is separately formed on the lower side of the module frame, and the module frame has no choice but to cool indirectly, the cooling efficiency is reduced. Since a separate refrigerant flowing structure is formed, there is a problem that the space utilization rate on a battery module and a battery pack on which the battery module is mounted is lowered. However, according to an embodiment of the present disclosure, by adopting a structure in which the heat sink is integrated at the lower part of the module frame 200, the refrigerant can flow directly between the flow passage part 340 of the cooling plate 300 and the bottom part 211 of the module frame 200, thereby increasing the cooling efficiency due to direct cooling, and through a structure in which the cooling plate 300 is integrated with the bottom part of the module frame 200, the space utilization rate on a battery module and a battery pack on which the battery module is mounted can be further improved.

The frame part 310 may be formed so as to correspond to the bottom part of the module frame 200. The bottom part 211 of the module frame 200 corresponds to the bottom part of the lower frame 210, the frame part 310 and the bottom part of the lower frame 210 may be coupled by welding, etc., The rigidity of the entire battery module may be reinforced through the frame part 310. The frame part 310 and the bottom part of the lower frame 210 are sealed through weld-coupling, whereby a refrigerant can flow without leakage in the flow passage part 340 formed inside the frame part 310.

Both the inlet part 320 and the outlet part 330 can be formed on one side of the cooling plate 300. More specifically, both the inlet part 320 and the outlet part 330 may be formed on one side of the cooling plate 300 that is formed at a portion at which the end plate 400 is located. The inlet part 320 and the outlet part 330 may be respectively located at both ends of one side of the cooling plate 300. A refrigerant supply part and a refrigerant discharge part are formed on the lower or upper side of the cooling plate 300, so that the refrigerant supplied through the refrigerant supply part may flow into the inlet part 320, and the refrigerant flowing out through the outlet part 330 may be discharged to the outside through the refrigerant discharge part.

The flow passage part 340 may be formed so as to cover the bottom part of the module frame 200 while being bent. The flow passage part 340 is formed in most of areas of the bottom part of the module frame 200 excluding a portion in which the frame part 310 makes contact with the bottom part of the module frame 200, whereby all the portions of the battery cell stack 100, which are arranged so as to occupy most of areas of the bottom part of the module frame 200, can be uniformly cooled.

The portion at which the flow passage part 340 is bent may be formed of a curved surface. When angled edge portions are formed in the flow passage part 340, it is likely that a flow of the refrigerant will stagnate at the angled edge portions, thus increasing a temperature deviation and a pressure drop. In this regard, if the bending part is treated with curved surfaces as in the embodiment of the present disclosure, the flow of the refrigerant can be made naturally.

Hereinafter, the first and second guide parts according to an embodiment of the present disclosure will be described along with comparative examples with reference to FIGS. 2 to 5.

FIG. 3 is a diagram showing a case in which an assembly line of a heat sink does not align as a comparative example. FIG. 4 is a section A in FIG. 2, which is a diagram showing a first guide part according to an embodiment of the present disclosure. FIG. 5 is a section A in FIG. 2, which is a diagram showing a second guide part according to an embodiment of the present disclosure.

Referring to FIGS. 2, 4 and 5, a guide part 2110 is formed on the bottom part 211 of the module frame 200, and the cooling plate 300 is coupled to the bottom part 211 of the module frame 200 to so as to correspond to the guide part 2110.

As shown in FIG. 3, when the cooling plate 300 is assembled to the module frame bottom part 211, the edge of the cooling plate 300 and the edge of the module frame bottom part 211 are not aligned and thus, assembly defects may occur. As the assembly defects occur, a gap is generated between the cooling plate 300 and the module frame bottom part 211, and there is a possibility that a phenomenon in which the refrigerant leaks through the gap may occur.

Thus, according to an embodiment of the present disclosure, the guide part 2110 is formed on the bottom part 211 of the module frame, and the cooling plate 300 is assembled to align with the guide part 2110, thereby improving assembly properties, preventing refrigerant leakage, and improving the quality of the battery module.

The guide part 2110 according to an embodiment of the present disclosure may include a first guide part 2111 formed at both side ends of the module frame bottom part 211 and a second guide part 2112 formed in a groove shape on the rear end edge side of the module frame bottom part 211.

Hereinafter, a first guide part according to an embodiment of the present disclosure will be described with reference to FIGS. 2, 4 and 6.

FIG. 4 is a diagram showing a first guide part according to an embodiment of the present disclosure. FIG. 6 is a section A in FIG. 2, which is a diagram showing the first guide part when the cooling plate is coupled to the bottom part of the module frame.

According to the embodiment of the present disclosure, the first guide part 2111 may be engraved in parallel with the edge sides 211*a* of both side ends at both side ends of the module frame bottom part 211. When the cooling plate 300 is assembled to the module frame bottom part 211, the first guide part 2111 can be arranged so as to align with both sides 300*a* of the cooling plate 300 as shown in FIG. 6. The cooling plate 300 may be symmetrically arranged with respect to both side ends of the module frame bottom part 211 through the first guide part 2111.

Hereinafter, a second guide part according to an embodiment of the present disclosure will be described with reference to FIGS. 2, 5, 7 and 8.

FIG. 5 is a diagram showing a second guide part according to an embodiment of the present disclosure. FIG. 7 is a section B in FIG. 2, which is a diagram showing the second guide part when the cooling plate is coupled to the bottom part of the module frame. FIG. 8 is a diagram showing a section taken line C-C' in FIG. 7.

According to the embodiment of the present disclosure, the second guide part 2112 may be formed in a groove shape on the rear end edge side 211*b* of the module frame bottom 211. When the cooling plate 300 is assembled to the module frame bottom part 211, the depression line D of the second guide part 2112 may be arranged so as to align with the rear side 300b of the cooling plate 300 as shown in FIGS. 7 and 8. According to the embodiment of the present disclosure, the groove-shaped second guide part 2112 is formed in a plurality of grooves, and the depression lines D of the plurality of grooves may be located on the same line. The cooling plate 300 may be arranged so as to correspond to the rear edge of the module frame bottom part 211 through the second guide part 2112.

The cooling plate 300 can be accurately assembled at a desired position and angle of the module frame bottom part 211 through the first and second guide parts 2111 and 2112 described above.

Hereinafter, a method of manufacturing a battery module according to an embodiment of the present disclosure will be described with reference to FIGS. 6 and 7.

Referring to FIGS. 6 and 7, a method of manufacturing a battery module according to an embodiment of the present disclosure includes a step of making both sides 300a of the cooling plate 300 correspond to first guide parts 2111 formed at both side ends of the bottom part of the module frame 211 (FIG. 6), a step of making a rear side of the cooling plate 300b correspond to a second guide part 2112 formed to be depressed at a rear end of the bottom part of the module frame (FIG. 7), and a step of coupling the cooling plate 300 to the bottom part 211 of the module frame.

According to the embodiment of the present disclosure, in the step of making both sides 300a of the cooling plate 300 correspond to first guide parts 2111, both sides 300a of the cooling plate 300 can be aligned with the guide part lines formed by the first guide parts 2111.

In the step of making a rear side of the cooling plate 300 correspond to the second guide part 2112, the rear side 300b of the cooling plate 300 can be aligned with a depression line D of the second guide part 2112. When assembling the cooling plate 300, the cooling plate 300 is assembled by aligning the lines formed by the first and second guide parts 2111 and 2112, so that the cooling plate 300 can be precisely arranged at positions corresponding to the edges of the module frame bottom part 211.

In the step of coupling the cooling plate 300 to the bottom part 211 of the module frame, the frame part 310 of the cooling plate 300 can be weld-coupled to the bottom part 311 of the module frame. Through weld-coupling, the cooling plate 300 and the module frame bottom part 211 can be sealed and coupled to prevent leakage of the refrigerant flowing therein.

The above-mentioned battery module can be included in the battery pack. The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

The invention claimed is:

1. A battery module comprising:
   a battery cell stack in which a plurality of battery cells are stacked;
   a module frame for accommodating the battery cell stack; and
   a cooling plate located below the module frame,
   wherein a bottom part of the module frame and the cooling plate form a heat sink,
   wherein a guide part is formed on the bottom part of the module frame, and the cooling plate is coupled to the bottom part of the module frame to correspond to the guide part,
   wherein the guide part comprises a first guide part and a second guide part, the second guide part having a groove shape at a rear end edge of the bottom part of the module frame, and a depression line formed by the groove shape is arranged to align vertically to a rear side edge of the cooling plate,
   wherein the rear end edge is opposite to a front end edge side of the module frame where an inlet part and an outlet part are located,
   wherein the depression line of the second guide part is a terminus of the bottom part of the module frame that is parallel to a plane surface of the module frame,
   wherein the rear side edge of the cooling plate is a terminus of the cooling plate that is parallel to a plane surface of the cooling plate,
   wherein the cooling plate includes a lateral side edge that extends parallel to the first guide part, the lateral side edge being another terminus of the cooling plate,
   wherein the first guide part is arranged to extend along a length of both sides of the cooling plate and is aligned with the lateral side edge of the cooling plate, and
   wherein the cooling plate and the lateral side edge of the cooling plate are located inward of the first guide part.

2. The battery module of claim 1, wherein:
   the first guide part is formed at both side ends of the bottom part of the module frame and engraved in parallel with an edge side of the both side ends of the bottom part of the module frame.

3. The battery module of claim 1, wherein:
   the groove shape is formed by a plurality of grooves, and depression lines of the plurality of grooves are located on the same line.

4. A battery pack comprising the battery module of claim 1.

5. The battery module of claim 1, wherein the cooling plate includes a flow passage to accommodate a flow of a refrigerant, and
   wherein the flow passage directly communicates with the bottom part of the module frame.

6. The battery module of claim 1, wherein the cooling plate includes a flow passage to accommodate a flow of a refrigerant, and
   wherein the flow passage is configured to have the refrigerant directly contact the bottom part of the module frame.

7. The battery module of claim 1, wherein the first guide part and the second guide part extend parallel to the plane surface of the module frame.

* * * * *